United States Patent [19]
Tomita

[11] Patent Number: 5,499,456
[45] Date of Patent: Mar. 19, 1996

[54] SIGHT SCOPE

[75] Inventor: Saburo Tomita, Fujimi, Japan

[73] Assignee: Asia Optical Co., Ltd., Tokyo, Japan

[21] Appl. No.: 398,074

[22] Filed: Mar. 3, 1995

[30] Foreign Application Priority Data

Mar. 3, 1994 [JP] Japan .................................. 6-058122

[51] Int. Cl.$^6$ ...................................................... F41G 1/38
[52] U.S. Cl. ............................. 33/245; 33/246; 359/399; 359/425; 356/247
[58] Field of Search ............................. 33/245, 246, 247, 33/248, 233; 359/399, 425, 426, 427, 428; 356/247

[56] References Cited

U.S. PATENT DOCUMENTS

| | | | |
|---|---|---|---|
| 2,948,188 | 8/1960 | Kollmorgen | 33/246 |
| 3,161,716 | 12/1964 | Burris et al. | 33/246 |
| 3,222,987 | 12/1965 | Wrigglesworth | 33/246 |
| 4,255,013 | 3/1981 | Allen | 33/247 |
| 4,389,791 | 6/1983 | Ackerman | 33/246 |

FOREIGN PATENT DOCUMENTS 59-94318  6/1984  Japan .

*Primary Examiner*—Christopher W. Fulton
*Attorney, Agent, or Firm*—Evenson McKeown Edwards & Lenahan

[57] ABSTRACT

In a sight scope, an erect sleeve received in a scope body is inclined with respect to the axis of the scope body by an inclination adjusting mechanism. A movable sleeve capable of moving axially of the erect sleeve is disposed within the erect sleeve, and an erect lens system is supported by this movable sleeve. A position adjusting mechanism for moving the movable sleeve axially of the scope body includes a rotary member. This rotary member is allowed to extend all the way through the scope body and supported for turning about an axis extending radially of the scope body. The rotary member has a control handle formed on an external end of the rotary member and a cam member disposed on an internal end of it. A follower is received in the scope body. This follower is moved axially of the scope body in accordance with rotation of the cam member. The movement of this follower is transmitted to the movable sleeve through an association sleeve which is fitted to the outer periphery of the erect sleeve.

7 Claims, 4 Drawing Sheets

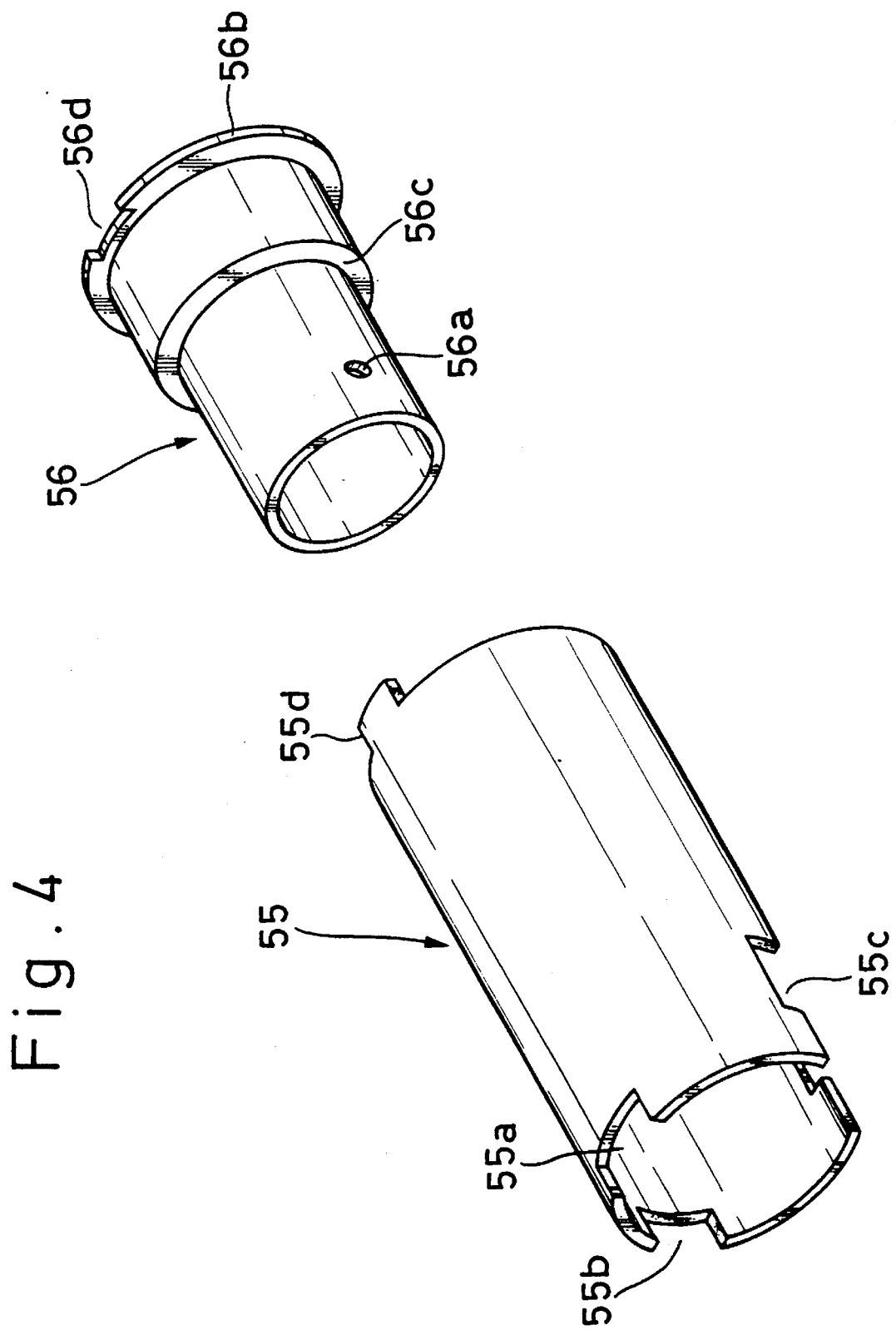

SIGHT SCOPE

BACKGROUND OF THE INVENTION

This invention relates to a sight scope used for a rifle gun, an archery and the like.

In general, a sight scope includes a sleeve-like scope body. This scope body has an objective lens system at a front end portion thereof and an eyepiece lens system at a rear end portion thereof. An erect sleeve is received in the scope body. An erect lens system is disposed within the erect sleeve so that the shooter can see a target as an erect image.

The erect sleeve is inclined upwardly and downwardly, rightwardly and leftwardly with respect to the axis of the scope body by an inclination adjusting mechanism, depending on a distance from the shooter to the target, wind power directing horizontally, and the like. Consequently, the target image is adjusted in relative position with respect to a reticle image.

On the other hand, the erect lens system received in the erect sleeve is positionally adjusted forwardly and backwardly depending on the distance from the shooter to the target, thereby effecting so-called focussing in order that the shooter can see the target clearly. The erect lens system is supported by a movable sleeve which is axially slideably received in the erect sleeve. This movable sleeve is adjusted in position by a position adjusting mechanism. As disclosed, for example, in Japanese Utility Model Laid-Open Application No. Sho 59-94318, the position adjusting mechanism has a rotary ring mounted on an outer periphery of the scope body for turning about the axis of the scope body, a cam cylinder disposed on an outer periphery of the erect sleeve for turning about the axis of the erect sleeve, a connection pin extending radially of the scope body and adapted to connect the rotary ring and the cam cylinder to each other, and a follower pin mounted on the movable sleeve. This follower pin is inserted into an axially extending slit formed in the erect sleeve, and a spiral slit formed in the cam cylinder. When the rotary ring is turned an angle corresponding to the distance, the cam cylinder is turned together with it through the connection pin. The movable sleeve is moved axially under the effect of cam action provided by the slit in the cam cylinder and the follower pin. By this, the position of the erect lens system is adjusted.

In the above-mentioned conventional sight scope, the rotary ring of the position adjusting mechanism is turned about the axis of the scope body. To turn the rotary ring about the axis of the scope body, it is necessary for the shooter to pinch the rotary ring with the thumb and the index finger or middle finger and to turn the entire arm about the scope body. Consequently, it gives rise to the problems in that a long time is required to turn the rotary ring and therefore, it takes a long time for focussing.

SUMMARY OF THE INVENTION

It is, therefore, an object of the present invention to provide a sight scope, in which focussing can be made simply and rapidly, depending on a distance from the shooter to a target.

According to the present invention, there is provided a sight scope comprising:

(a) a sleeve-like scope body having an objective lens system on a front end portion thereof and an eyepiece lens system on a rear end portion thereof;

(b) an erect sleeve received in the scope body;

(c) an inclination adjusting mechanism for inclining the erect sleeve with respect to an axis of the scope body;

(d) a movable sleeve axially movably disposed within the erect sleeve and adapted to support an erect lens system; and (e) a position adjusting mechanism for moving the movable sleeve axially of the scope body, the position adjusting mechanism including:

(i) a rotary member pierced into and supported by the scope body, the rotary member being capable of turning about an axis extending radially of the scope body;

(ii) a control handle mounted on an external end of the rotary member;

(iii) a cam member disposed at an internal end of the rotary member;

(iv) a follower received in the scope body, the follower being in association with the cam member and moved axially of the scope body in accordance with rotation of the cam member; and (v) association means for associating the follower with the movable sleeve, so that the movable sleeve moves after the follower.

BRIEF DESCRIPTION OF THE DRAWING

FIG. 4 is an exploded perspective view of a follower sleeve and an association sleeve, which are used in the sight scope of FIG. 1.

DETAILED DESCRIPTION OF THE INVENTION

Figure 1:
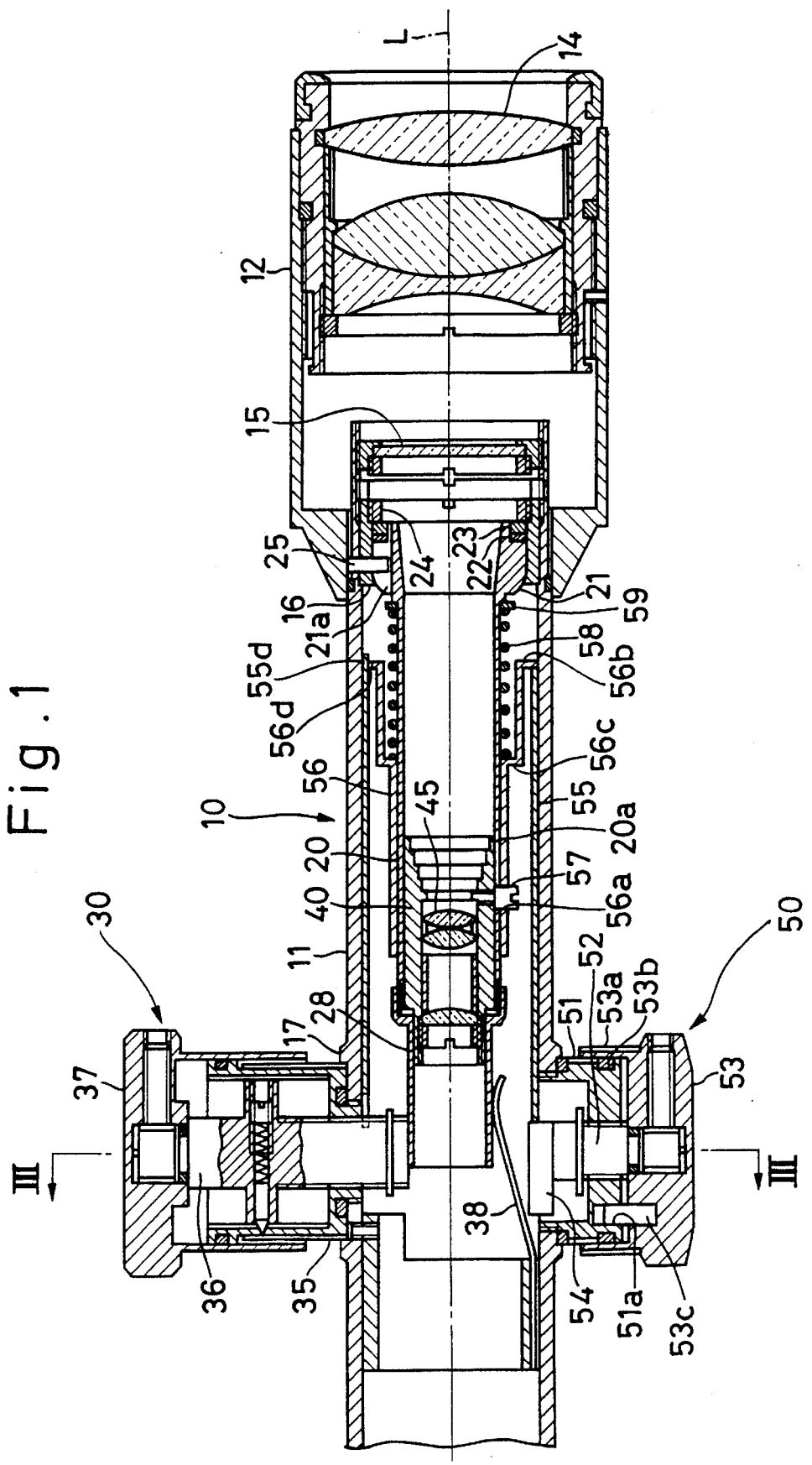
FIG. 1 is a sectional plan view showing an overall sight scope, only excepting a front end portion, according to one embodiment of the present invention.
Figure 2:
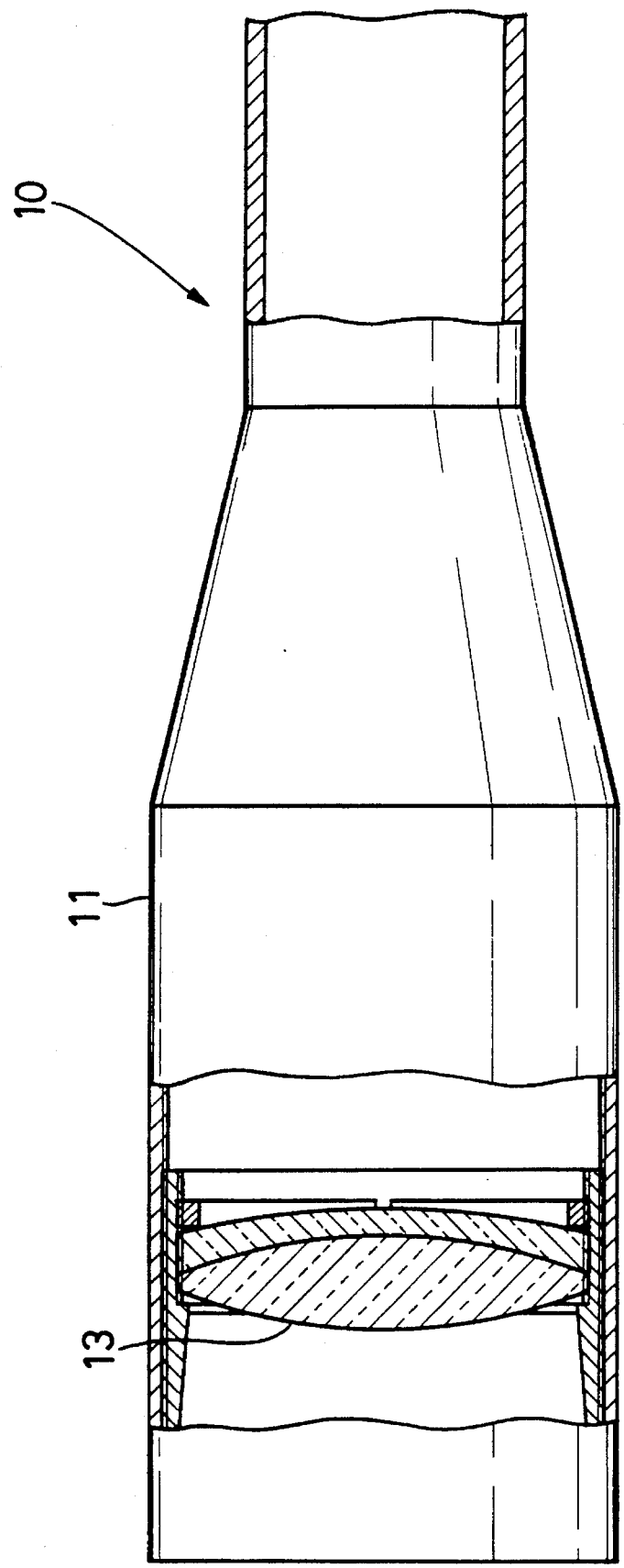
FIG. 2 is a plan view, partly in section, of the front end portion of the sight scope of FIG. 1.

The present invention will now be described with reference to the accompanying drawings. As shown in FIG. 1, the sight scope includes a sleeve-like scope body 10. This scope body 10 includes a main sleeve 11 having a front end portion of an enlarged diameter, and an eyepiece sleeve 12 secured to a rear end portion of the main sleeve 11. The axis of the main sleeve 11 is indicated by a one-dot chain line L in FIG. 1. An objective lens system 13 (see FIG. 2) is disposed within the front end of the main sleeve 11, and an eyepiece lens system 14 is disposed within an eyepiece sleeve 12. On the rear end of the main sleeve 11, a reticle 15 is mounted in front of the eyepiece lens system 14.

A sleeve-like bearing member 16 is secured to the rear end portion of the main sleeve 11 at a location in front of the reticle 15. An inner peripheral surface of the front end portion of this bearing member 16 is spherical. Within the main sleeve 11, a circular-cylindrical erect sleeve 20 is received. A rear end portion of the erect sleeve 20 is defined as a joint 21 having a spherical outer peripheral surface. When this joint 21 is received in the bearing member 16, the erect sleeve 20 is turnably supported (namely, inclineably supported with respect to the axis L of the scope body 10) for turning about the joint 21. An annular cut is formed in a rear end portion of the joint 21. A wave washer 22 and a rubber 0-ring 23 are received in this annular cut. A pressing ring 24 is threadedly engaged with an inner peripheral surface of the rear end portion of the bearing member 16. This pressing ring 24 is adapted to lock the joint 21 through the wave washer 22 and the 0-ring 23 so that the erect sleeve 20 is prohibited from moving backwardly. A pin 25 is allowed to extend radially all the way through the main sleeve 11 and the bearing member 16, and received in a slit 21a which is formed in the joint 21 of the erect sleeve 20 and allowed to extend axially. Owing to the foregoing arrangement, the erect sleeve 20 is prohibited from turning about the axis L.

Figure 3:
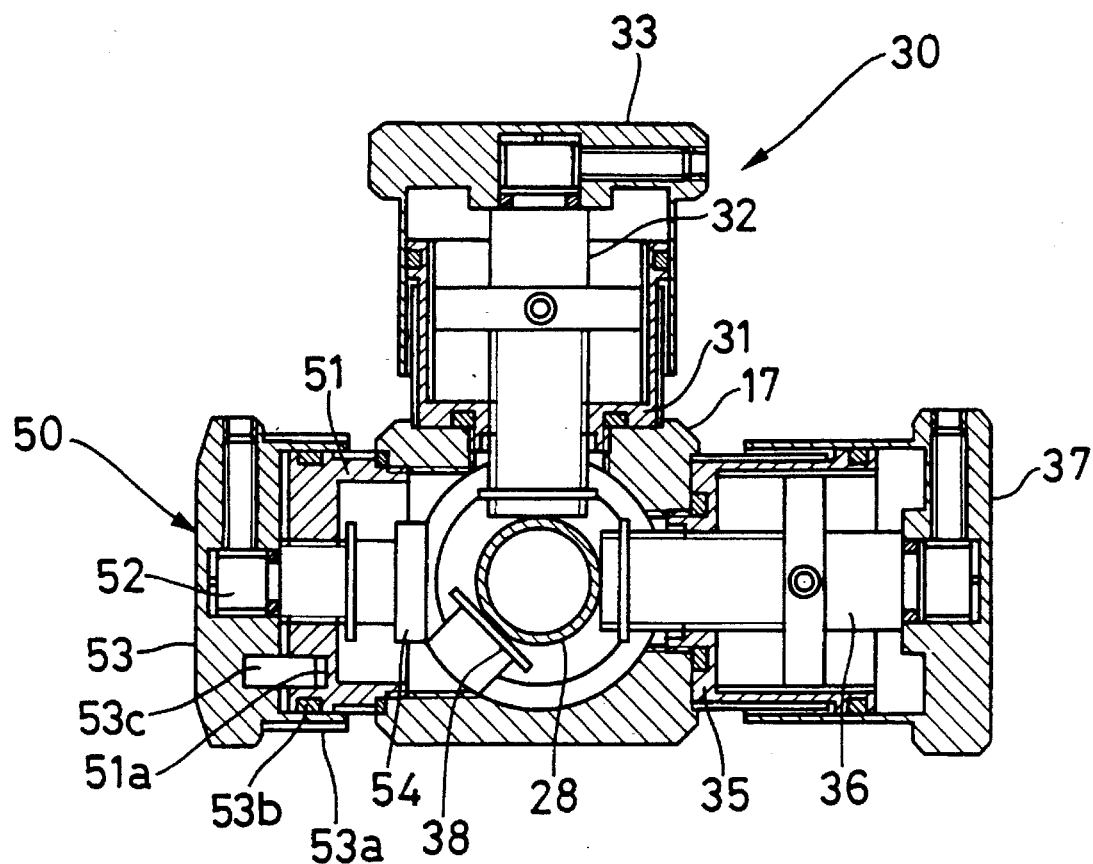
FIG. 3 is a sectional view taken on line III—III of FIG. 1.

Next, an inclination adjusting mechanism 30 for inclining the erect sleeve 20 with respect to the axis L of the scope body 10 will be described in detail. As best shown in FIG. 3, the inclination adjusting mechanism 30 is mounted on a mounting portion 17 having a square configuration in section, formed on an intermediate portion of the main sleeve 11. A lower end portion of a support sleeve 31 is threadedly engaged with an upper part of the mounting portion 17. A shaft 32 (rotary member) extending vertically and radially of the scope body 10 is threadedly engaged with the lower end portion of the support sleeve 31. An internal end of the shaft 32 is faced with an internal space of the mounting portion 17. A control handle 33 is secured to an external end of the shaft 32. When this control handle 33 is turned, the shaft 32 is moved vertically while turning together with the control handle 33.

Similarly, a left end portion of the support sleeve 35 is threadedly engaged with a right part of the mounting portion 17, when viewed from the shooter side. Another shaft 36 (rotary member) extending horizontally and radially of the scope body 10 is threadedly engaged with the left end portion of the support sleeve 35. An internal end of this shaft 36 is faced with the internal space of the mounting portion 17. A control handle 37 is secured to an external end of the shaft 36. When this control handle 37 is turned, the shaft 36 is moved horizontally (rightwardly and leftwardly) while turning together with the control handle 37.

As shown in FIGS. 1 and 3, an auxiliary sleeve 28 provided as a part of the erect sleeve 20 is threadedly secured to an outer periphery of the front end of the erect sleeve 20. A front end portion of this auxiliary sleeve 28 is in pressure contact with internal end faces of the shafts 32 and 36 under the effect of a plate spring 38 one end of which is secured to an inner periphery of the main sleeve 11. Therefore, when the control handle 33 is turned, the front end portion of the erect sleeve 20 is moved upwardly and downwardly, thereby the vertical inclination of the erect sleeve 20 can be adjusted, depending on a distance from the shooter to the target. Also, when the control handle 37 is turned, the front end portion of the erect sleeve 20 is moved rightwardly and leftwardly, thereby the horizontal inclination of the erect sleeve 20 can be adjusted with respect to wind, etc.

A movable sleeve 40 is axially slideably received within the front end portion of the erect sleeve 20. An erect lens system 45 is disposed within the movable sleeve 40. An inverted image of the target, which is provided by the objective lens system 13, can be provided as an erect image by the erect lens system 45.

The movable sleeve 40 is adjusted in position by a novel position adjusting mechanism 50. This position adjusting mechanism 50 will now be described in detail. As shown in FIGS. 1 and 3, a support sleeve 51 is threadedly secured to a left part, when viewed from the shooter, of the mounting portion 17. A shaft 52 (rotary member) extending horizontally and radially of the scope body 10 is threadedly engaged with the support sleeve 51. A control handle 53 is secured to an external end of the shaft 52. The control handle 53 has a sleeve portion 53a disposed outside the support sleeve 51. An 0-ring 53b made of rubber or the like is disposed between the sleeve portion 53a and the support sleeve 51. Owing to this arrangement, an appropriate frictional resistance is produced between the control handle 53 and the support sleeve 51, so that the control handle 53 is not turned unless a torque of a predetermined magnitude or more acts on it.

A pin 53c extending radially of the scope body 10 is secured to the control handle 53. Insertion of this pin 53c into an actuate groove 51a formed in the support sleeve 51 and extending circumferentially of the support sleeve 51 has the effect of limiting the turning range of the control handle 53.

An internal end portion of the shaft 52 is faced with a hollow interior of the scope body 10. A disc-like eccentric cam 54 is secured to the internal end portion of the shaft 52.

As shown in FIG. 1, a circular-cylindrical follower sleeve 55 is axially slideably fitted to the inner periphery of the scope body 10. A front end of this follower sleeve 55 is in contact with an outer peripheral surface of the cam 54 under the effect of a coil spring 58 as later described. Therefore, when the cam 54 is rotated in accordance with the turning motion of the control handle 53, the follower sleeve 55 is also moved axially. FIG. 1 shows the follower sleeve 55 in the most foreword position.

As shown in FIG. 4, the follower sleeve 55 is provided with cuts 55a and 55b formed in a front end portion thereof and another cut 55c likewise formed in the front end portion. The first-mentioned cuts 55a and 55b are for receiving the shafts 32 and 36 of the inclination adjusting mechanism 30, while the last-mentioned cut 55c is for receiving the plate spring 38. The arrangement being such that when the follower sleeve 55 is moved forwardly, the front end portion of the follower sleeve 55 does not contact the shafts 32 and 36 and the plate spring 38. The follower sleeve 55 is further provided with a lug 55d formed on a rear end thereof and projecting axially.

As shown in FIG. 1, a circular-cylindrical association sleeve 56 is axially slideably fitted to the outer periphery of the erect sleeve 20. This association sleeve 56 is disposed inside the follower sleeve 55. As shown in FIGS. 1 and 4, a through-hole 56a is formed in a front end portion of the association sleeve 56. As shown in FIG. 1, a head portion of a pin 57 threadedly secured to the movable sleeve 40 is inserted in the through-hole 56a. By this, the association sleeve 56 is connected to the movable sleeve 40. The head portion of the pin 57 is inserted in a slit 20a formed in the erect sleeve 20 and extending axially. Owing to this arrangement, the movable sleeve 40 and the association sleeve 56 can move in the direction of the axis L. The width, in the sense of the circumferential direction of the erect sleeve 20, of the slit 20a, is generally equal to the diameter of the head portion of the pin 57. With this feature, the movable sleeve 40 and the association sleeve 56 are incapable of turning about the axis of the erect sleeve 20.

The association sleeve 56 has an annular flange 56b formed on a rear end portion thereof and extending radially outwardly. The association sleeve 56 is biased forwardly by the coil spring 58, so that the flange 56b contacts the rear end of the follower sleeve 55. Owing to the foregoing arrangement, the association sleeve 56 moves after the follower sleeve 55 in the axial direction. The coil spring 58 is wound around the erect sleeve 20, and interposed in a compressed state between an annular step portion 56c formed on an intermediate portion of the association sleeve 56 and a spring retainer portion 59 provided on the rear end portion of the erect sleeve 20.

A cut 56d is formed in the flange 56b of the association sleeve 56. Fitting of the lug 55d formed on the follower sleeve 55 into this cut 56d makes it impossible for the follower sleeve 55 to turn about its axis.

With the above-mentioned construction of the sight scope, when the control handle 53 in the position of FIG. 1 is turned in one direction, the follower sleeve 55 is moved backwardly under the effect of cam action of the cam 54 and the follower sleeve 55, and the association sleeve 56 and the movable sleeve 40 are also moved backwardly. If the control handle 53 is turned in the other direction when the movable sleeve 40 is in the backward position, the movable sleeve 40 is moved forwardly, together with the follower sleeve 55 and the association sleeve 56, by the biasing force of the coil spring 58. Therefore, by properly turning the control handle 53 depending on the distance between the shooter and the target, an erect image of the target is formed (focused) in position where the reticle 15 is situated. As a result, the shooter can clearly see the erect image through the eyepiece lens system 14.

Since the control handle 53 is disposed outside the scope body 10 and turnable about an axis extending across the axis L at right angles (i.e., an axis extending radially of the scope body 10), the control handle 53 can be turned by fingers such as, for example, the thumb and the index finger or middle finger. Therefore, focusing can be made easily and rapidly.

The present invention is not limited to the above embodiment but can be modified without departing from the gist of the invention.

What is claimed is:

1. A sight scope comprising:
   (a) a sleeve-like scope body having an objective lens system on a front end portion thereof and an eyepiece lens system on a rear end portion thereof;
   (b) an erect sleeve received in said scope body;
   (c) an inclination adjusting mechanism for inclining said erect sleeve with respect to an axis of said scope body;
   (d) a movable sleeve axially movably disposed within said erect sleeve and adapted to support an erect lens system; and
   (e) a position adjusting mechanism for moving said movable sleeve axially of said scope body, said position adjusting mechanism including:
      (i) a rotary member pierced into and supported by said scope body, said rotary member being capable of turning about an axis extending radially of said scope body;
      (ii) a control handle mounted on an external end of said rotary member;
      (iii) a cam member disposed at an internal end of said rotary member;
      (iv) a follower received in said scope body, said follower being in association with said cam member and moved axially of said scope body in accordance with rotation of said cam member; and
      (v) association means for associating said follower with said movable sleeve, so that said movable sleeve moves after said follower.

2. A sight scope according to claim 1, in which said cam member is in the form of an eccentric cam, and said follower is biased forwardly by biasing means such that a front end of said follower is in contact with a peripheral surface of said cam member.

3. A sight scope according to claim 2, in which said follower is of a circular-cylindrical configuration and slideably fitted to an inner periphery of said scope body.

4. A sight scope according to claim 3, in which said association means includes an association sleeve fitted to an outer periphery of said erect sleeve, said association sleeve being connected to said movable sleeve through a pin extending radially of said association sleeve, said pin being received in a slit formed in said erect sleeve and extending axially.

5. A sight scope according to claim 4, in which said association sleeve has a flange formed on a rear end thereof, said association sleeve being biased by said biasing means such that said flange is in contact with a rear end of said follower, thereby transmitting a force of said biasing means to said follower.

6. A sight scope according to claim 5, in which said association sleeve has an annular step portion formed on an intermediate portion thereof and said erect sleeve has a spring retainer portion formed on the outer periphery of said erect sleeve at a location backward from said step portion, said biasing means being of a coil-spring-like configuration and wound around the outer periphery of said erect sleeve, said biasing means being interposed in a compressed state thereof between said step portion of said association sleeve and said spring retainer portion of said erect sleeve.

7. A sight scope according to claim 1, in which said scope body is formed thereon with a mounting portion, said inclination adjusting mechanism for inclining said erect sleeve vertically being disposed on an upper part of said mounting portion, another inclination adjustment mechanism being disposed at a left or right part of said mounting portion and adapted to incline said erect sleeve horizontally, said rotary member of said position adjusting mechanism being disposed on the remaining left or right portion of said mounting portion.

* * * * *